(12) United States Patent
Tamai et al.

(10) Patent No.: US 9,991,568 B2
(45) Date of Patent: Jun. 5, 2018

(54) BATTERY-TEMPERATURE ADJUSTMENT APPARATUS

(71) Applicant: NISSAN MOTOR CO., LTD., Yokohama-shi, Kanagawa (JP)

(72) Inventors: Kazuma Tamai, Zama (JP); Tsutomu Soga, Machida (JP); Yoshimasa Toki, Sagamihara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days. days.

(21) Appl. No.: 14/385,629

(22) PCT Filed: Mar. 12, 2013

(86) PCT No.: PCT/JP2013/056845
§ 371 (c)(1),
(2) Date: Sep. 16, 2014

(87) PCT Pub. No.: WO2013/141090
PCT Pub. Date: Sep. 26, 2013

(65) Prior Publication Data
US 2015/0079433 A1  Mar. 19, 2015

(30) Foreign Application Priority Data

Mar. 19, 2012 (JP) ................................ 2012-061360

(51) Int. Cl.
*H01M 10/60* (2014.01)
*H01M 10/625* (2014.01)
(Continued)

(52) U.S. Cl.
CPC ........... *H01M 10/502* (2013.01); *B60L 1/003* (2013.01); *B60L 1/04* (2013.01); *B60L 3/00* (2013.01);
(Continued)

(58) Field of Classification Search
CPC .................... H01M 10/502; H01M 10/5016
See application file for complete search history.

(56) References Cited

U.S. PATENT DOCUMENTS 6,624,615 B1   9/2003  Park
8,796,994 B2   8/2014  Abe et al.
(Continued)

FOREIGN PATENT DOCUMENTS

EP   2 209 177 A2   7/2010
JP   2000-030766 A  1/2000
(Continued)

OTHER PUBLICATIONS

Japanese Office Action and English translation, Jan. 20, 2015, 13 pages.

*Primary Examiner* — Sarah A. Slifka
*Assistant Examiner* — Brian R Ohara
(74) *Attorney, Agent, or Firm* — Foley & Lardner LLP

(57) ABSTRACT

A battery temperature adjustment apparatus including a battery, a temperature adjustment section configured to operate by power supplied from an external power source or the battery and adjust a temperature of the battery by heating or cooling, a detection section configured to detect a temperature of the battery, and a control section configured to change an operating condition or an operating state of the temperature adjustment section according to whether or not the external power source to supply power to the battery is electrically connected, and in a case where the external power source is not electrically connected, restrict the operation of the temperature adjustment section so as to reduce power consumed in the battery as compared to a case where the external power source is electrically connected.

17 Claims, 6 Drawing Sheets

(51) Int. Cl.
  *H01M 10/63* (2014.01)
  *H01M 10/48* (2006.01)
  *B60L 1/00* (2006.01)
  *B60L 1/04* (2006.01)
  *B60L 3/00* (2006.01)
  *B60L 11/18* (2006.01)

(52) U.S. Cl.
  CPC ......... *B60L 11/185* (2013.01); *B60L 11/1816* (2013.01); *B60L 11/1874* (2013.01); *B60L 11/1875* (2013.01); *B60L 11/1877* (2013.01); *H01M 10/48* (2013.01); *H01M 10/60* (2015.04); *H01M 10/625* (2015.04); *H01M 10/63* (2015.04); *B60L 2240/34* (2013.01); *B60L 2240/545* (2013.01); *B60L 2270/46* (2013.01); *H01M 2220/20* (2013.01); *Y02T 10/7005* (2013.01); *Y02T 10/705* (2013.01); *Y02T 10/7072* (2013.01); *Y02T 10/92* (2013.01); *Y02T 90/121* (2013.01); *Y02T 90/128* (2013.01); *Y02T 90/14* (2013.01)

(56) References Cited

U.S. PATENT DOCUMENTS

| | | | |
|---|---|---|---|
| 2009/0140698 | A1 | 6/2009 | Eberhard et al. |
| 2012/0222438 | A1* | 9/2012 | Osaka ................ B60H 1/00271 62/126 |
| 2012/0280050 | A1 | 11/2012 | Tonozuka et al. |

FOREIGN PATENT DOCUMENTS

| | | |
|---|---|---|
| JP | 2004-111123 A | 4/2004 |
| JP | 2009-83670 A | 4/2009 |
| JP | 2009-252688 A | 10/2009 |
| JP | 2010-262879 A | 11/2010 |
| JP | 2011-111140 A | 6/2011 |
| WO | WO 2011/074330 A1 | 6/2011 |
| WO | WO 2011/093137 A1 | 8/2011 |

* cited by examiner

BATTERY-TEMPERATURE ADJUSTMENT APPARATUS

TECHNICAL FIELD

The present invention relates to a battery temperature adjustment apparatus for adjusting the temperature of a battery.

Charge/discharge efficiency and degradation rate of a battery as a secondary battery depends on the temperature condition of the battery. For instance, Patent Literature 1 discloses a battery temperature adjustment apparatus capable of suitably adjusting a temperature of an entire battery. Specifically, during normal charging/discharging time of the battery, the temperature adjustment apparatus adjusts the temperature of the battery to lie within a range of recommended usage temperature of the battery during the charging/discharging time of the battery, for instance, within a temperature range of from 10° C. to 50° C. Further, during discharging time of the battery before quick charging, the temperature adjustment apparatus adjusts the temperature of the battery to lie within a range of recommended usage temperature of the battery during the quick charging time, for instance, within a temperature range of from 10° C. to 30° C.

CITATION LIST

Patent Literature

Patent Literature 1: Japanese Patent Application Unexamined Publication No. 2010-262879 A

SUMMARY OF INVENTION

Technical Problem

Incidentally, in such circumstances that an external power source to supply electric power to a battery is not present, for instance, when the electric vehicle equipped with the battery is in a running state, the temperature adjustment apparatus is operated by electric power supplied from the battery. Therefore, performance deterioration and degradation of the battery can be suppressed by using the battery temperature adjustment apparatus, but there is a problem that the electric power of the battery is consumed to thereby cause reduction in cruisible distance of the electric vehicle.

The present invention has been made in consideration of the above circumstances. An object of the present invention is to suppress performance deterioration and degradation of the battery and at the same time, suppress reduction in cruisible distance of the electric vehicle.

Solution to Problem

In order to solve the above problems, a battery temperature adjustment apparatus according to the present invention is provided. In the temperature adjustment apparatus, based on a temperature of a battery, a control section is configured to control an operation of a temperature adjustment section such that the temperature of the battery falls in a predetermined temperature range. In this case, the control section is configured to change an operating condition or operating state of the temperature adjustment section according to whether or not an external power source for supplying electric power to the battery is present.

Advantageous Effects of Invention

According to the present invention, it is possible to control operating frequency or power consumption of the temperature adjustment section by changing the operating condition or operating state of the temperature adjustment section. Therefore, in such circumstances that an external power source to supply electric power to the battery is not present, it is possible to suppress consumption of the electric power in the battery while carrying out temperature adjustment of the battery through the control. As a result, it is possible to suppress performance deterioration and degradation of the battery and at the same time, suppress reduction in cruisible distance of the electric vehicle.

DESCRIPTION OF EMBODIMENT

First Embodiment

Figure 1:
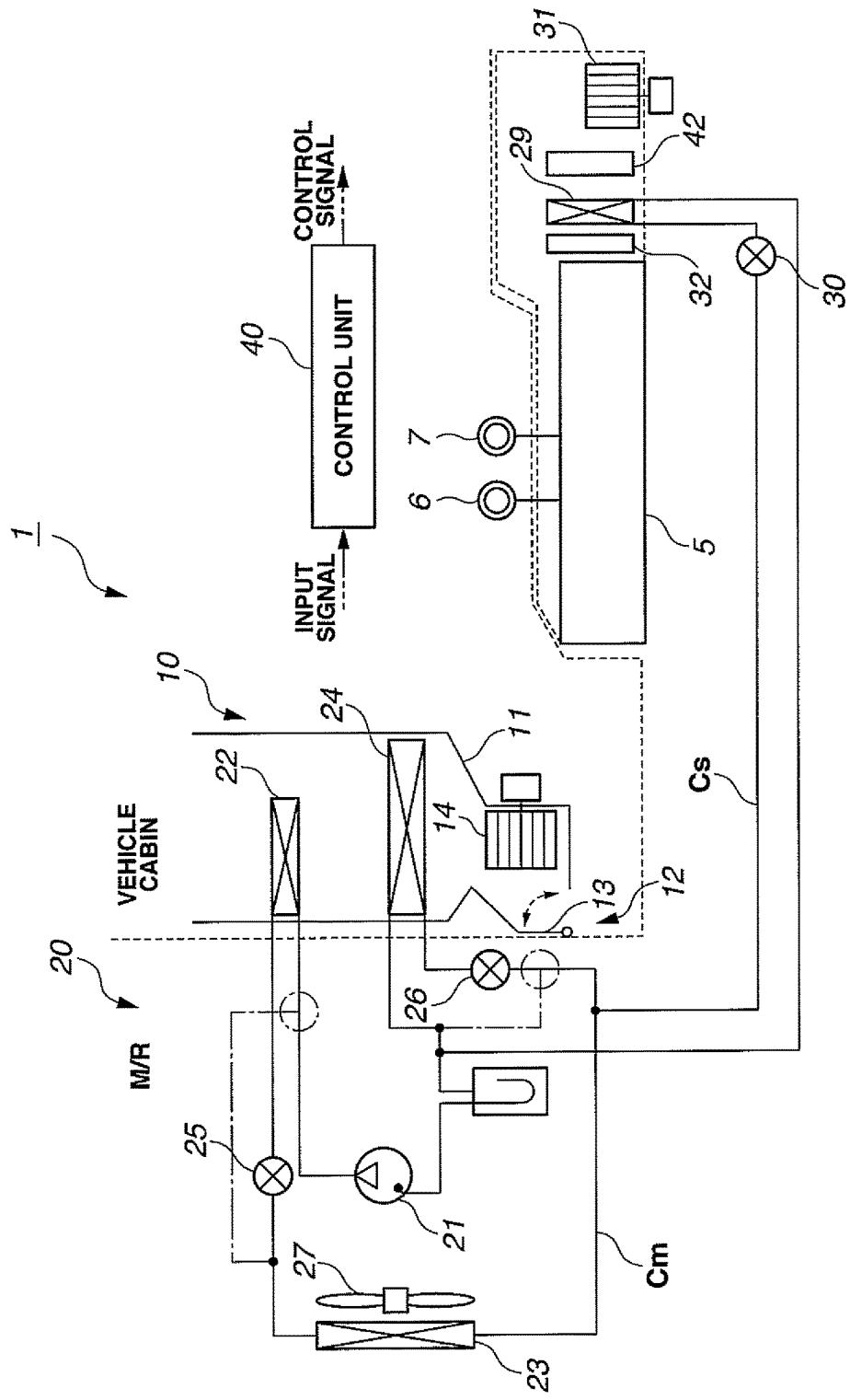
FIG. 1 is an explanatory diagram schematically showing an essential part of an electric vehicle.

FIG. 1 is an explanatory diagram schematically showing an essential part of electric vehicle 1 according to the present embodiment. Electric vehicle 1 includes a motor (not shown) as a drive source. The motor is mounted in a motor room (M/R) on a front side of the vehicle. Further, in electric vehicle 1, battery 5 that supplies electric power to the motor and various electrical components (electric accessories) is mounted under a floor in the interior space. Electric vehicle 1 includes charging ports 6, 7 for charging battery 5 with the electric power supplied from an external power source.

First charging port 6 is a charging port connectable with a quick charger as one form of the external power source. The quick charger is one of the facilities built as an infrastructure for battery charging of electric vehicle 1. For instance, the quick charger has such a performance level as to output DC power with a maximum output of 50 kW based on input of three-phase alternating current at 200 volts. By connecting the quick charger and electric vehicle 1 with each other via first charging port 6, the electric power outputted from the quick charger is supplied to a side of electric vehicle 1, so that battery 5 can be charged. The charging form using the quick charger is called as quick charging, and has an advantage that an amount of the electric power supplied per unit time is larger than that in ordinary charge that is a charging form using a charging cable as described below.

On the other hand, second charging port 7 is a charging port connectable to a charging cable that may be connected to a commercial power source (not shown) as one form of the external power source. The commercial power source has a receptacle for connecting a plug, and the charging cable is connected to the receptacle upon use. By connecting the charging cable and electric vehicle 1 with each other through second charging port 7, the electric power outputted through the charging cable is supplied to a side of electric vehicle 1, so that battery 5 can be charged.

Further, electric vehicle 1 includes vehicular air conditioner 10 that controls the temperature of the vehicle cabin, etc., for instance, a heat pump type air conditioner. Vehicular air conditioner 10 is mainly constituted of blower unit 11 and air conditioning unit 20. Vehicular air conditioner 10 is operated by the electric power supplied from the external power source or battery 5.

Blower unit 11 is a unit that takes-in air inside the vehicle cabin (inside air) or air outside the vehicle cabin (outside air) and supplies the air to the vehicle cabin. Blower unit 11 includes a blower duct for delivering the air. Intake portion 12 is disposed on an upstream side of the blower duct, and includes intake door 13. Intake door 13 is a movable door that closes one of an inside air introduction port and an outside air introduction port. With the provision of intake door 13, it is possible to select one of the inside air and the outside air as the air to be supplied to the vehicle cabin. Further, the blower duct includes blower 14. By operating blower 14, the air taken from intake portion 12 flows in the blower duct, and is fed to a downstream side (inside the vehicle cabin). In this case, the air (outside air or inside air) fed to the downstream side passes through first internal heat exchanger 22 or second internal heat exchanger 24 as described later, and then is supplied from an outlet (not shown) into the vehicle cabin.

Air conditioning unit 20 is mainly constituted of compressor 21, first internal heat exchanger 22, external heat exchanger 23, second internal heat exchanger 24, first expansion valve 25 and second expansion valve 26. These elements constituting air conditioning unit 20 are disposed in a closed loop refrigerant passage (hereinafter referred to as "main refrigerant passage") Cm through which a refrigerant is circulated. With the provision of the main refrigerant passage Cm, the refrigerant passes through compressor 21, first internal heat exchanger 22, external heat exchanger 23 and second internal heat exchanger 24 in this order, and returns to compressor 21. Further, in the main refrigerant passage Cm, first expansion valve 25 is disposed between first internal heat exchanger 22 and external heat exchanger 23, and second expansion valve 26 is disposed between external heat exchanger 23 and second internal heat exchanger 24.

In a case where an operation mode is a heating mode, the refrigerant compressed by compressor 21 and thereby brought into a high temperature and high pressure state by being is supplied to first internal heat exchanger 22. First internal heat exchanger 22 performs heat exchange between the air blown by blower 14 and the refrigerant, so that the heat of the refrigerant is radiated to the air. After passing through first internal heat exchanger 22, the refrigerant is expanded by first expansion valve 25 and thereby held in a low temperature and low pressure state, and then supplied to external heat exchanger 23. At this time, since the refrigerant has a temperature lower than the outside air, external heat exchanger 23 performs heat exchange between the outside air and the refrigerant, so that the heat of the outside air is absorbed by the refrigerant. After that, the refrigerant returns to compressor 21.

Further, second expansion valve 26 has an adjustable aperture (valve opening) as an area through which the refrigerant flows. In the heating mode, second expansion valve 26 is opened and has no expansion function. Further, a bypass circuit (as indicated by dashed line in the figure) may be provided so as to bypass second expansion valve 26 and second internal heat exchanger 24.

On the other hand, in a case where the operating mode is a cooling mode, the refrigerant that is compressed by compressor 21 and held in a high temperature and high pressure state is supplied to external heat exchanger 23. External heat exchanger 23 performs heat exchange between an outside air and the refrigerant, so that heat of the refrigerant is radiated and transferred to the outside air. After passing through external heat exchanger 23, the refrigerant is expanded by second expansion valve 26 and thereby transformed into a low temperature and low pressure state, and then supplied to second internal heat exchanger 24. Second internal heat exchanger 24 performs heat exchange between the air blown by blower 14 and the refrigerant, so that heat of the air is absorbed by the refrigerant.

Further, first expansion valve 25 has an adjustable aperture (valve opening) as an area through which the refrigerant flows. In the cooling mode, first expansion valve 25 is opened and has no expansion function. Further, a bypass circuit (as indicated by dashed line in the figure) may be provided so as to prohibit heat exchange in first internal heat exchanger 22 and first expansion valve 25.

Here, as one feature of the present embodiment, vehicular air conditioner 10 also has a function as a temperature adjustment section that performs adjustment of the temperature of battery 5 by heating or cooling. Specifically, air conditioning unit 20 further includes battery heat exchanger 29. Battery heat exchanger 29 is connected to sub refrigerant passage Cs for supplying the refrigerant and sub refrigerant passage Cs for discharging the refrigerant, and performs heat exchange between the refrigerant and battery 5. The other end of the sub refrigerant passage Cs for supplying the refrigerant is connected to main refrigerant passage Cm between external heat exchanger 23 and second expansion valve 26. The other end of the sub refrigerant passage Cs for discharging the refrigerant is connected to main refrigerant passage Cm between second internal heat exchanger 24 and compressor 21. With this construction, a part or whole of the refrigerant fed from external heat exchanger 23 to compressor 21 passes through battery heat exchanger 29.

Third expansion valve 30 is arranged in the sub refrigerant passage Cs for supplying the refrigerant, i.e., on an upstream side of battery heat exchanger 29 in the refrigerant path. Similarly to first and second expansion valves 25 and 26, third expansion valve 30 has an adjustable aperture (valve opening) as an area through which the refrigerant flows. In the above-described cooling mode, the aperture of third expansion valve 30 is adjusted to throttle and expand the refrigerant that passes through the aperture. With the provision of third expansion valve 30, the refrigerant supplied to the sub refrigerant passage Cs for supplying the refrigerant is expanded by third expansion valve 30 and thereby transformed into a low temperature and low pressure state. After that, the refrigerant is supplied to battery heat exchanger 29. Battery heat exchanger 29 performs heat exchange between ambient air and the refrigerant.

Blower 31 is disposed around battery heat exchanger 29. Further, disposed around battery heat exchanger 29 is heater 32 that is operated by electric power supplied from the external power source or battery 5 (for instance, PCT heater). Heater 32 serves as a part of the temperature adjustment section that performs adjustment of the temperature of battery 5. The air fed from blower 31 passes through battery heat exchanger 29 and heater 32, and then reaches battery 5. That is, the air that has reached battery 5 was subjected to necessary heating and cooling by battery heat exchanger 20 or heater 32. Consequently, it is possible to perform cooling and heating of battery 5.

However, vehicular air conditioner 10 may perform adjustment of the temperature of battery 5 in a state independent of air conditioning in the vehicle cabin by utilizing the bypass circuit, etc. as described above.

Control unit 40 (controller) has a function of integratedly controlling electric vehicle 1. For instance, a microcomputer mainly constituted of CPU, ROM, RAM, and I/O interface can be used as control unit 40. Control unit 40 carries out various computations in accordance with a control program stored in the ROM. Control unit 40 outputs control signals corresponding to control amounts calculated by the computations to various actuators.

In respect to the present embodiment, control unit 40 controls an operation of vehicular air conditioner 10 such that the temperature of battery 5 (hereinafter referred to as "battery temperature") falls in a predetermined temperature range. Specifically, when the battery temperature has reached an operation start temperature, control unit 40 starts an operation of air conditioner 10 or heater 32 to thereby start cooling or heating of battery 5. Further, when the battery temperature has reached an operation stop temperature, control unit 40 stops the operation of air conditioner 10 or heater 32 to thereby end the cooling or heating of battery 5. Further, control unit 40 suitably executes the cooling or heating in accordance with the temperature condition of battery 5. However, in the present embodiment, assuming the circumstances where the temperature of battery 5 becomes high, cooling control of battery 5 will be explained below.

Various input signals including sensor signals are inputted to control unit 40 in order to perform various control operations. Battery temperature sensor 42 is a detection section configured to detect the battery temperature through the temperature of ambient air of battery 5. Further, control unit 40 can determine whether or not the external power source is connected to charging ports 6, 7 and can further determine whether the external power source is a quick charger or a charging cable. Control unit 40 can also determine whether or not battery 5 is during charging.

Figure 2:
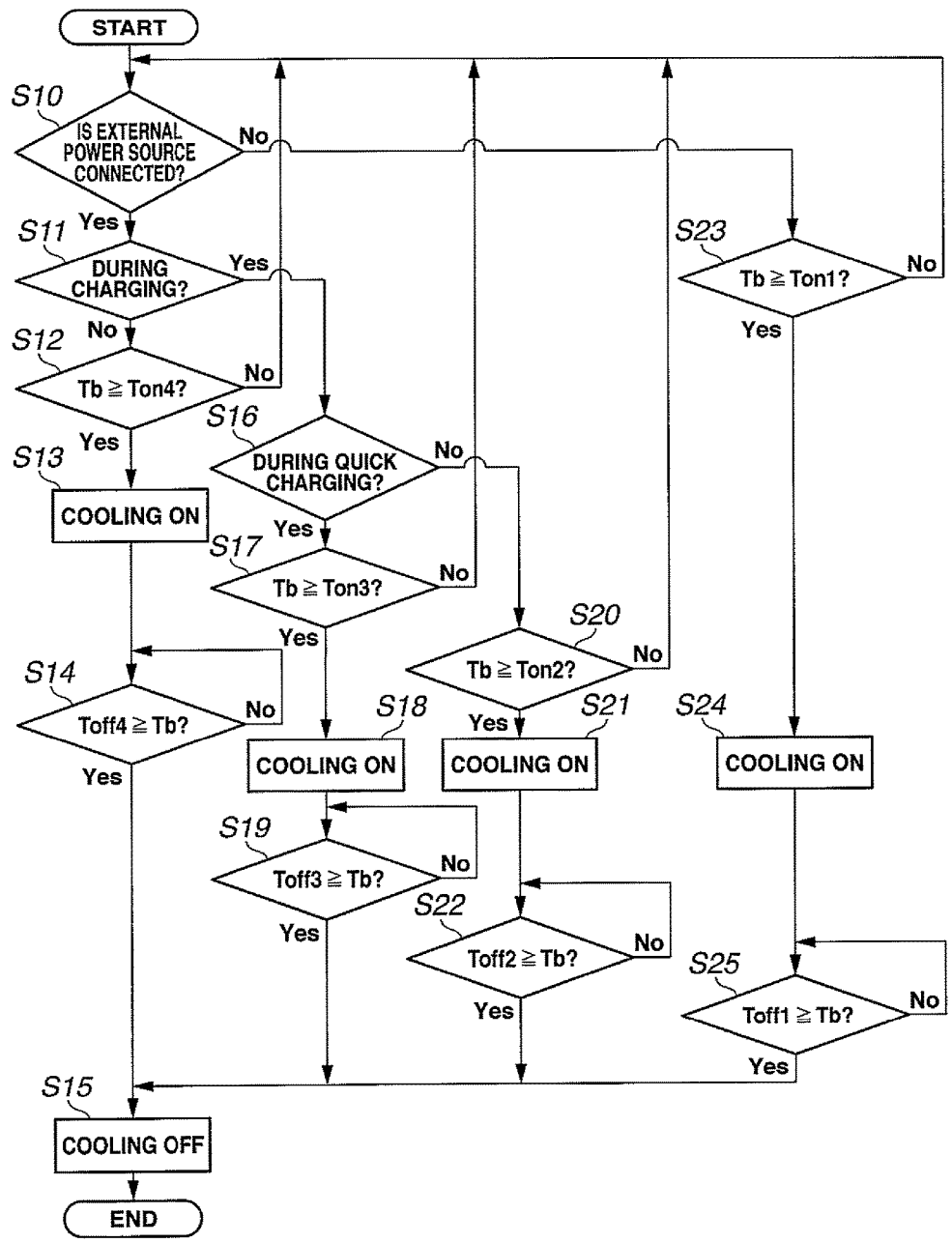
FIG. 2 is a flow chart showing a routine relating to cooling control of a battery according to a first embodiment of the present invention.

FIG. 2 is a flow chart showing a routine relating to the cooling control of battery 5 according to the present embodiment. The processing shown in the flowchart is executed by control unit 40.

Firstly, in step 10 (S10), control unit 40 determines whether or not an external power source is connected to electric vehicle 1 (specifically, charging ports 6, 7). By the determination in step 10, it is determined whether or not an external power source to supply electric power to the battery is present. When an affirmative determination is made in step 10, that is, when the external power source is connected to electric vehicle 1, the process proceeds to step 11 (S11). On the other hand, when a negative determination is made in step 10, that is, when the external power source is not connected to electric vehicle 1, the logic flow proceeds to step 23 (S23) as described later.

In step 11, control unit 40 determines whether or not battery 5 is during charging. When a negative determination is made in step 11, that is, when charging of battery 5 is stopped due to full charge and for other reasons, the logic flow proceeds to step 12 (S12). On the other hand, when an affirmative determination is made in step 11, that is, when battery 5 is during charging, the logic flow proceeds to step 16 (S16) as described later.

In step 12, control unit 40 determines whether or not battery temperature Tb is equal to or higher than fourth cooling start temperature Ton4. The cooling start temperature is a temperature for determining start of the operation of vehicular air conditioner 10 relating to cooling of battery 5. In the present embodiment, four different cooling start temperatures, i.e., first to fourth cooling start temperatures Ton1-Ton4, are preset based on the state of a relationship between the external power source and battery 5. The fourth cooling start temperature Ton4 provided in the present step is lower than the first cooling start temperature Ton1, and also is lower than the third cooling start temperature Ton3 and the second cooling start temperature Ton2.

When an affirmative determination is made in step 12, that is, when the battery temperature Tb is equal to or higher than the fourth cooling start temperature Ton4, the logic flow proceeds to step 13 (S13). On the other hand, when a negative determination is made in step 12, that is, when the battery temperature Tb is lower than the fourth cooling start temperature Ton4, the logic flow returns to step 10.

In step 13, control unit 40 starts the operation of vehicular air conditioner 10, thereby starting cooling of battery 5 (cooling on).

In step 14 (S14), control unit 40 determines whether or not the battery temperature Tb is equal to or lower than fourth cooling stop temperature Toff4. The cooling stop temperature is a temperature for determining stop of the operation of vehicular air conditioner 10 relating to cooling of battery 5. Four different cooling stop temperatures, i.e., first to fourth cooling stop temperatures Toff1-Toff4, are preset corresponding to the first to fourth cooling start temperatures Ton1-Ton4. The fourth cooling stop temperature Toff4 provided in the present step is set to a value lower than that of the above-described fourth cooling start temperature Ton4, and set to such a temperature value as to cause no problem in view of safety and degradation of battery 5 in a non-load condition. Further, in the present embodiment, the fourth cooling stop temperature Toff4 is set to the same value as those of the first cooling stop temperature Toff1 to the third cooling stop temperature Toff3.

When an affirmative determination is made in this step 14, that is, when the battery temperature Tb is equal to or lower than the fourth cooling stop temperature Toff4, the logic flow proceeds to step 15 (S15). On the other hand, when a negative determination is made in step 14, that is, when the battery temperature Tb is higher than the fourth cooling stop temperature Toff4, the logic flow returns to step 14.

Subsequently, in step 15, the operation of vehicular air conditioner 10 is stopped to thereby finish the cooling of battery 5 (cooling off).

On the other hand, in step 16, control unit 40 determines whether or not a charging form of battery 5 is quick charging. When an affirmative determination is made in this step 16, that is, when the charging form of battery 5 is quick charging, the logic flow proceeds to step 17 (S17). When a negative determination is made in step 16, that is, when the charging form of battery 5 is normal charging, the logic flow proceeds to step 20 (S20).

In step 17, control unit 40 determines whether or not the battery temperature Tb is equal to or higher than the third cooling start temperature Ton3. The third cooling start temperature Ton3 provided in the present step is lower than the first cooling start temperature Ton1, and higher than the fourth cooling start temperature Ton4 and lower than the second cooling start temperature Ton2.

When an affirmative determination is made in this step 17, that is, the battery temperature Tb is equal to or higher than the third cooling start temperature Ton3, the logic flow proceeds to step 18 (S18). On the other hand, when a negative determination is made in step 17, that is, the battery temperature Tb is lower than the third cooling start temperature Ton3, the logic flow returns to step 10.

In step 18, control unit 40 starts the operation of vehicular air conditioner 10, thereby starting cooling of battery 5 (cooling on).

In step 19 (S19), control unit 40 determines whether or not the battery temperature Tb is equal to or lower than the third cooling stop temperature Toff3. The third cooling stop temperature Toff3 provided in the present step is set to a value lower than that of the above-described third cooling start temperature Ton3, and set to such a temperature value as to cause no problem in view of safety and degradation of battery 5 in a non-load condition. Further, in the present embodiment, the third cooling stop temperature Toff3 is set to the same value as those of the first cooling stop temperature Toff1, the second cooling stop temperature Toff2 and the fourth cooling stop temperature Toff4.

When an affirmative determination is made in this step 19, that is, when the battery temperature Tb is equal to or lower than the third cooling stop temperature Toff3, the logic flow proceeds to the above-described step 15. On the other hand, when a negative determination is made in step 19, that is, when the battery temperature Tb is higher than the third cooling stop temperature Toff3, the logic flow returns to step 19.

In step 20, control unit 40 determines whether or not the battery temperature Tb is equal to or higher than the second cooling start temperature Ton2. The second cooling start temperature Ton2 provided in the present step is lower than the first cooling start temperature Ton1, and higher than the fourth cooling start temperature Ton4 and the third cooling start temperature Ton3.

When an affirmative determination is made in this step 20, that is, when the battery temperature Tb is equal to or higher than the second cooling start temperature Ton2, the logic flow proceeds to step 21 (S21). On the other hand, when a negative determination is made in step 20, that is, when the battery temperature Tb is lower than the second cooling start temperature Ton2, the logic flow returns to step 10.

In step 21, control unit 40 starts the operation of vehicular air conditioner 10, thereby starting cooling of battery 5 (cooling on).

In step 22 (S22), control unit 40 determines whether or not the battery temperature Tb is equal to or lower than the second cooling stop temperature Toff2. The second cooling stop temperature Toff2 provided in the present step is set to a value lower than that of the above-described second cooling start temperature Ton2, and set to such a temperature value as to cause no problem in view of safety and degradation of battery 5 in a non-load condition. Further, in the present embodiment, the second cooling stop temperature Toff2 is set to the same value as those of the first cooling stop temperature Toff1, the third cooling stop temperature Toff3 and the fourth cooling stop temperature Toff4.

When an affirmative determination is made in this step 22, that is, when the battery temperature Tb is equal to or lower than the second cooling stop temperature Toff2, the logic flow proceeds to the above-described step 15. On the other hand, when a negative determination is made in step 22, that is, when the battery temperature Tb is higher than the second cooling stop temperature Toff2, the logic flow returns to step 22.

In step 23, control unit 40 determines whether or not the battery temperature Tb is equal to or higher than the first cooling start temperature Ton1. The first cooling start temperature Ton1 provided in the present step is higher than the second to fourth cooling start temperatures Ton2-Ton4.

When an affirmative determination is made in this step 23, that is, when the battery temperature Tb is equal to or higher than the first cooling start temperature Ton1, the logic flow proceeds to step 24 (S24). On the other hand, when a negative determination is made in step 23, that is, when the battery temperature Tb is lower than the first cooling start temperature Ton1, the logic flow returns to step 10.

In step 24, control unit 40 starts the operation of vehicular air conditioner 10, thereby starting cooling of battery 5 (cooling on).

In step 25 (S25), control unit 40 determines whether or not the battery temperature Tb is equal to or lower than the first cooling stop temperature Toff1. The first cooling stop temperature Toff1 provided in the present step is set to a value lower than that of the above-described first cooling start temperature Ton1, and set to such a temperature value as to cause no problem in view of safety and degradation of battery 5 in a non-load condition. Further, in the present embodiment, the first cooling stop temperature Toff1 is set to the same value as those of the second to fourth cooling stop temperatures Toff2-Toff4.

When an affirmative determination is made in this step 25, that is, when the battery temperature Tb is equal to or lower than the first cooling stop temperature Toff1, the logic flow proceeds to the above-described step 15. On the other hand, when a negative determination is made in step 25, that is, when the battery temperature Tb is higher than the second cooling stop temperature Toff2, the logic flow returns to step 25.

Thus, in the present embodiment, based on the battery temperature Tb, control unit 40 controls the operation of vehicular air conditioner 10 such that the temperature condition of battery 5 falls within a predetermined temperature range. In this case, control unit 40 changes the operating condition or operating state of vehicular air conditioner 10 according to whether or not an external power source to supply electric power to battery 5 is present.

With the above configuration, it is possible to control operating frequency (operating time) or power consumption of vehicular air conditioner 10 by changing the operating condition or operating state of vehicular air conditioner 10. Therefore, in such circumstances that an external power source to supply electric power to battery 5 is not present, the power consumed in battery 5 can be reduced even while the cooling of battery 5 is performed, by executing the above control. As a result, it is possible to suppress performance deterioration and degradation of battery 5, and at the same time, suppress reduction in cruisible distance of electric vehicle 1.

Further, in the present embodiment, control unit 40 is configured to change the cooling start temperatures (Ton1-Ton4) as the operating condition of vehicular air conditioner 10 which are the operation start temperatures of vehicular air conditioner 10.

Figure 3:
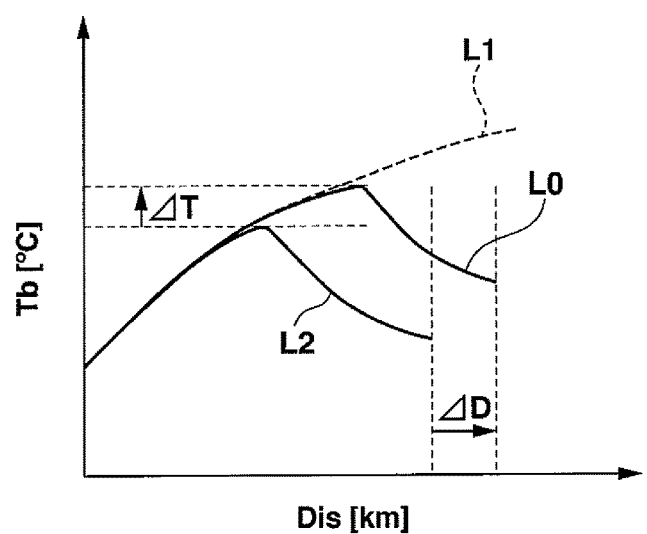
FIG. 3 is an explanatory diagram schematically showing a relationship between cruisible distance and battery temperature.

FIG. 3 is an explanatory diagram schematically showing a relationship between cruisible distance Dis and battery temperature Tb. In the figure, reference sign L0 shows a state in which the control according to the present embodiment is applied, reference sign L1 shows a state in which the cooling control is not performed, and reference sign L2 shows a state in which the cooling start temperature is set at a constant value regardless of the condition. As shown in the figure, it can be recognized that the cruisible distance Dis is increased by amount ΔD by setting the cooling start temperature to a temperature higher by amount ΔT. Thus, by changing the cooling start temperature of vehicular air conditioner 10, it is possible to suppress the power consumed in battery 5 even while performing the cooling of battery 5. As a result, it is possible to suppress performance deterioration and degradation of battery 5, and at the same time, suppress reduction in cruisible distance of electric vehicle 1.

Specifically, in the present embodiment, control unit 40 sets the first cooling start temperature Ton1 that is set in a case where an external power source to supply electric power to battery 5 is not present, to a value higher than those of the second to fourth cooling start temperatures Ton2-Ton4 that are set in a case where an external power source to supply electric power to battery 5 is present. With this configuration, the operating frequency of vehicular air conditioner 10 can be decreased, so that the power consumption in battery 5 can be suppressed even while the cooling of battery 5 is performed. As a result, it is possible to suppress performance deterioration and degradation of battery 5, and at the same time, suppress reduction in cruisible distance of electric vehicle 1.

Further, in the present embodiment, in a case where the external power source is present, control unit 40 changes the cooling start temperatures (Ton2-Ton4) of vehicular air conditioner 10 according to whether or not battery 5 is during charging. Specifically, control unit 40 sets the second or third cooling start temperature Ton2, Ton3 that is set in a case where battery 5 is during charging, to a value higher than that of the fourth cooling start temperature Ton4 that is set in a case where charging of battery 5 is stopped.

With the above configuration, in such circumstances that the charging is performed by the external power source, the power consumption in battery 5 can be suppressed. As a result, it is possible to suppress such a situation that charging time of battery 5 is prolonged.

Further, in the present embodiment, in a case where battery 5 is during charging, control unit 40 changes the cooling start temperatures (Ton2, Ton3) of vehicular air conditioner 10 according to whether or not the charging form is quick charging. Specifically, control unit 40 sets the second cooling start temperature Ton2 that is set in a case where the charging form is non-quick charging (normal charging), to a value higher than that of the third cooling start temperature Ton3 that is set in a case where the charging form is quick charging.

Since the charging power on the normal charging is smaller than that on the quick charging, there occurs a problem that when vehicular air conditioner 10 is operated, the electric power that is charged to battery 5 on the normal charging becomes small to thereby increase the time required for charging. In this regard, with the above-described configuration, it is possible to suppress the power consumption in battery 5. As a result, it is possible to suppress such a situation that the charging time becomes longer.

Second Embodiment

In the following, cooling control of battery 5 according to a second embodiment is explained. The cooling control of battery 5 according to the second embodiment is in common with the first embodiment in the point of variably controlling the operating condition of vehicular air conditioner 10 based on the state of a relationship between the external power source and battery 5. However, the present embodiment contemplates to obtain the above-described function and effect similar to those of the first embodiment by presetting the first to fourth cooling stop temperatures Toff1-Toff4 to values different from each other on the basis of the state of a relationship between the external power source and battery 5, while setting the first to fourth cooling start temperatures Ton1-Ton4 to a value identical with each other.

Specifically, the following relationship between the first to fourth cooling stop temperatures Toff1-Toff4 is established.

$$Toffn(n=2,3,4)<Toff1 \tag{1}$$

$$Toff4<Toffm(m=2,3) \tag{2}$$

$$Toff3<Toff2 \tag{3}$$

Further, the first to fourth cooling start temperatures Ton1-Ton4 are set to values higher than those of the corresponding cooling stop temperatures Toff1-Toff4, respectively, and set to such temperature values as to cause no problem in view of safety and degradation of battery 5 in a load condition required for running. Further, in the present embodiment, the following relationship between the first to fourth cooling start temperatures Ton1-Ton4 is established.

$$Ton1=Ton2=Ton3=Ton4 \tag{1}$$

Thus, according to the present embodiment, control unit 40 is configured to change the cooling stop temperatures (Toff1-Toff4) that are the operation stop temperatures of vehicular air conditioner 10, as the operating condition of vehicular air conditioner 10.

With the above configuration, it is possible to reduce the power consumed in battery 5 even while cooling of battery 5 is performed, by changing the cooling stop temperatures (Toff1-Toff4) of vehicular air conditioner 10. As a result, it is possible to suppress performance deterioration and degradation of battery 5, and at the same time, suppress reduction in cruisible distance of electric vehicle 1.

Specifically, in the present embodiment, control unit 40 sets the first cooling stop temperature Toff1 that is set in a case where an external power source to supply electric power to battery 5 is not present, to a value higher than those of the second to fourth cooling stop temperatures Toff2-Toff4 that are set in a case where an external power source to supply electric power to battery 5 is present. With this configuration, the operating frequency of vehicular air conditioner 10 can be decreased, so that the power consumption in battery 5 can be suppressed even while the cooling of battery 5 is performed. As a result, it is possible to suppress performance deterioration and degradation of battery 5, and at the same time, suppress reduction in cruisible distance of electric vehicle 1.

Further, in the present embodiment, in a case where the external power source is present, control unit 40 changes the cooling stop temperatures (Toff2-Toff4) of vehicular air conditioner 10 according to whether or not battery 5 is during charging. Specifically, control unit 40 is configured to set the second or third cooling stop temperature Toff2, Toff3 that is set in a case where battery 5 is during charging, to a value higher than that of the fourth cooling stop temperature Toff4 that is set in a case where charging of battery 5 is stopped.

With the above configuration, in such circumstances that the charging is performed by the external power source, the power consumption in battery 5 can be suppressed. As a result, it is possible to suppress such a situation that the charging time of battery 5 is prolonged.

Further, in the present embodiment, in a case where battery 5 is during charging, control unit 40 changes the cooling stop temperatures (Toff2, Toff3) of vehicular air conditioner 10 according to whether or not the charging form is quick charging. Specifically, control unit 40 sets the second cooling stop temperature Toff2 that is set in a case where the charging form is non-quick charging (normal charging), to a value higher than that of the third cooling stop temperature Toff3 that is set in a case where the charging form is quick charging.

Since the charging power on the normal charging is smaller than that on the quick charging, there occurs a problem that when vehicular air conditioner 10 is operated, the electric power that is charged to battery 5 on the normal charging becomes small to thereby increase the time required for charging. In this regard, with the above-described configuration, it is possible to suppress the power consumption in battery 5. As a result, it is possible to suppress such a situation that the charging time becomes longer.

Third Embodiment

Figure 4:
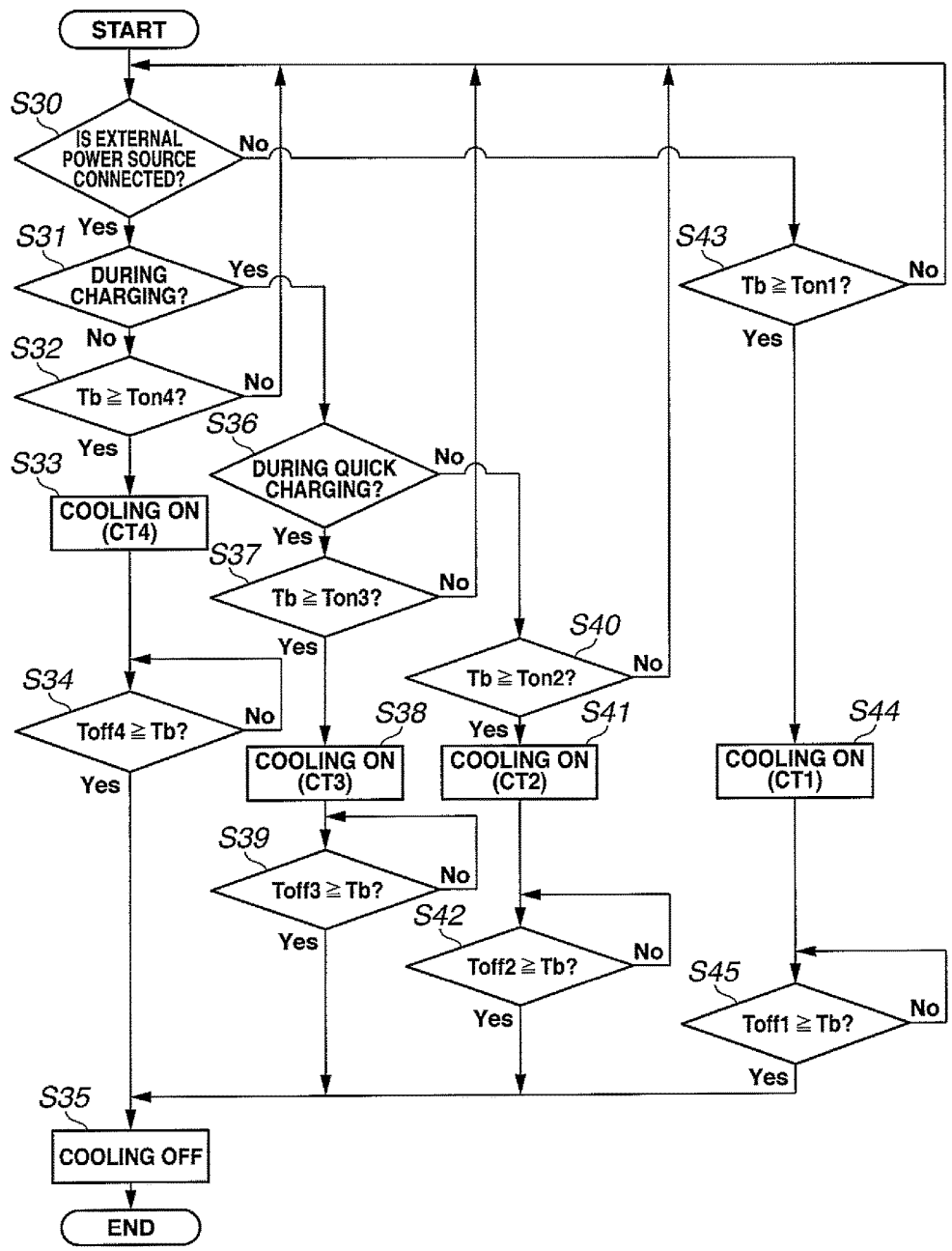
FIG. 4 is a flow chart showing a routine relating to cooling control of a battery according to a third embodiment of the present invention.

FIG. 4 is a flow chart showing a routine relating to cooling control of battery 5 according to a third embodiment of the present invention. The cooling control of battery 5 according to the third embodiment differs from that of the first embodiment in that an operating state of vehicular air conditioner 10 is variably controlled based on the state of a relationship between the external power source and battery 5. Explanations about the points that are in common with the first embodiment are omitted, and the points that are different from the first embodiment will be mainly explained hereinafter.

In the present embodiment, the first to fourth cooling start temperatures Ton1-Ton4 are set to such temperatures as to cause no problem in view of safety and degradation of battery 5 in a load condition required for running, and are set to the same value. On the other hand, the first to fourth cooling stop temperatures Toff1-Toff4 are set to such temperatures as to cause no problem in view of safety and degradation of battery 5 in a non-load condition, and are set to the same value.

As shown in FIG. 4, the processing in each step corresponds to the processing in each step shown in the first embodiment, but differs therefrom in the following points.

Specifically, in step 33 (S33), control unit 40 starts the operation of vehicular air conditioner 10, thereby starting cooling of battery 5 (cooling on). In this case, control unit 40 controls an output of vehicular air conditioner 10 on the basis of fourth target output temperature CT4. Here, the target output temperature is a target value of the output temperature of vehicular air conditioner 10 relating to the cooling of battery 5. In the present embodiment, four different target output temperatures, i.e., first to fourth target output temperatures CT1-CT4, are preset based on the state of a relationship between the external power source and battery 5. The fourth target output temperature CT4 provided in the present step is lower than the first target output temperature CT1, and is also lower than the third target output temperature CT3 and the second target output temperature CT2.

Further, in step 38 (S38), control unit 40 starts the operation of vehicular air conditioner 10, thereby starting cooling of battery 5 (cooling on). In this case, control unit 40 controls the output of vehicular air conditioner 10 based on the third target output temperature CT3. The third target output temperature CT3 provided in the present step is lower than the first target output temperature CT1, higher than the fourth target output temperature CT4, and lower than the second target output temperature CT2.

Further, in step 41 (S41), control unit 40 starts the operation of vehicular air conditioner 10, thereby starting cooling of battery 5 (cooling on). In this case, control unit 40 controls the output of vehicular air conditioner 10 based on the second target output temperature CT2. The second target output temperature CT2 provided in the present step is lower than the first target output temperature CT1, and higher than the fourth target output temperature CT4 and the third target output temperature CT3.

Further, in step 44 (S44), control unit 40 starts the operation of vehicular air conditioner 10, thereby starting cooling of battery 5 (cooling on). In this case, control unit 40 controls the output of vehicular air conditioner 10 based on the first target output temperature CT1. The first target output temperature CT1 provided in the present step is higher than the second to fourth target output temperatures CT2-CT4.

Thus, in the present embodiment, control unit 40 is configured to change the target output temperatures (CT1-CT4) of vehicular air conditioner 10 as the operating state of vehicular air conditioner 10.

With the above configuration, it is possible to reduce the power consumed in battery 5 even while cooling of battery 5 is performed, by changing the target output temperatures (CT1-CT4) of vehicular air conditioner 10. As a result, it is possible to suppress performance deterioration and degradation of battery 5, and at the same time, suppress reduction in cruisible distance of electric vehicle 1.

Figure 5:
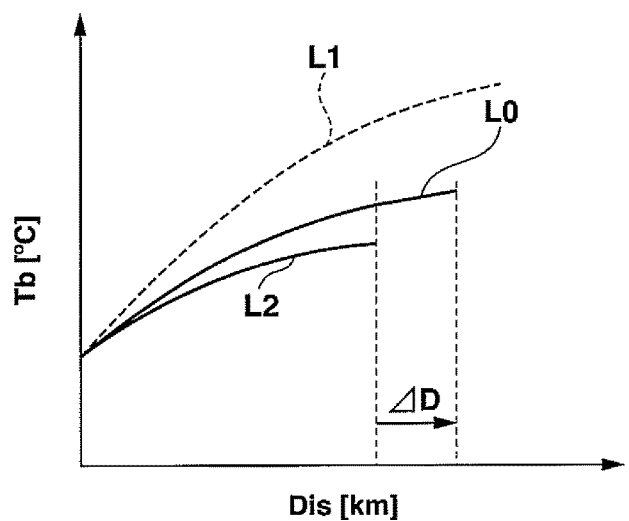
FIG. 5 is an explanatory diagram schematically showing a relationship between cruisible distance and battery temperature.

FIG. 5 is an explanatory diagram schematically showing a relationship between cruisible distance Dis and battery temperature Tb. In the figure, reference sign L0 shows a state in which the control shown in the present embodiment is applied, reference sign L1 shows a state in which the cooling control is not performed, and reference sign L2 shows a state in which the target output temperature is set at a constant value regardless of the condition. As shown in the figure, it can be recognized that the cruisible distance Dis is increased (ΔD) by setting the target output temperature to a high temperature. Thus, by changing the target output temperature of vehicular air conditioner 10, it is possible to suppress the power consumed in battery 5 even while performing the cooling of battery 5. As a result, it is possible to suppress performance deterioration and degradation of battery 5, and at the same time, suppress reduction in cruisible distance of electric vehicle 1.

Figure 6:
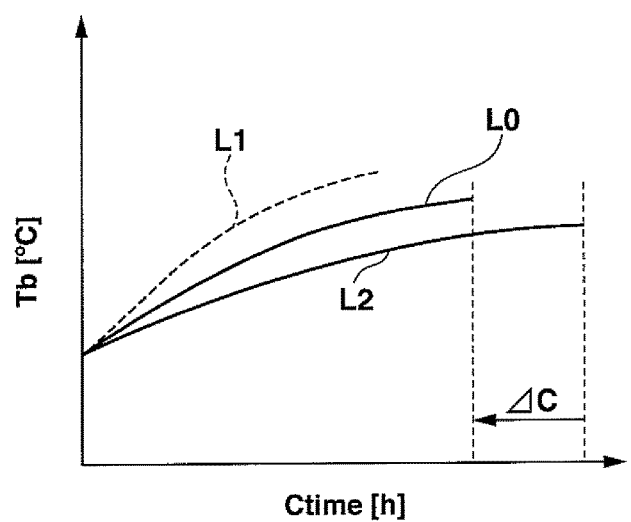
FIG. 6 is an explanatory diagram schematically showing a relationship between battery charging time and battery temperature.

In addition, FIG. 6 is an explanatory diagram schematically showing a relationship between charging time Ctime of battery 5 and battery temperature Tb. In the figure, reference sign L0 shows a state in which the control shown in the present embodiment is applied, reference sign L1 shows a state in which the cooling control is not performed, and reference sign L2 shows a state in which the target output temperature is set at a constant value regardless of the condition. As shown in the figure, it can be recognized that increase in charging time of battery 5 is suppressed (ΔC) by setting the target output temperature to a high temperature. Thus, by changing the target output temperature of vehicular air conditioner 10, it is possible to suppress the power consumed in battery 5 even while performing the cooling of battery 5. As a result, it is possible to suppress such a situation that the charging time of battery 5 is prolonged.

Specifically, in the present embodiment, control unit 40 sets the first target output temperature CT1 that is set in a case where an external power source to supply electric power to battery 5 is not present, to a value higher than those of the second to fourth target output temperatures CT2-CT4 that are set in a case where an external power source to supply electric power to battery 5 is present. With this configuration, the power consumed by vehicular air conditioner 10 can be decreased, so that the power consumption in battery 5 can be suppressed even while the cooling of battery 5 is performed. As a result, it is possible to suppress performance deterioration and degradation of battery 5, and at the same time, suppress reduction in cruisible distance of electric vehicle 1.

Further, in the present embodiment, in a case where an external power source is present, control unit 40 changes the target output temperatures (CT2-CT4) of vehicular air conditioner 10 according to whether or not battery 5 is during charging. Specifically, control unit 40 sets the second or third target output temperature CT2, CT3 that is set in a case where battery 5 is during charging, to a value higher than that of the fourth target output temperature CT4 that is set in a case where charging of battery 5 is stopped.

With the above configuration, in such circumstances that the charging is performed by the external power source, the power consumption in battery 5 can be suppressed. As a result, it is possible to suppress such a situation that the charging time of battery 5 is prolonged.

Further, in the present embodiment, in a case where battery 5 is during charging, control unit 40 changes the target output temperatures (CT2, CT3) of vehicular air conditioner 10 according to whether or not the charging form is quick charging. Specifically, control unit 40 sets the second target output temperature CT2 that is set in a case where the charging form is non-quick charging (normal charging), to a value higher than that of the third target output temperature CT3 that is set in a case where the charging form is quick charging.

Since the charging power on the normal charging is smaller than that on the quick charging, there occurs a problem that when vehicular air conditioner 10 is operated, the electric power that is charged to battery 5 on the normal charging becomes small to thereby increase the time required for charging. In this regard, with the above-described configuration, it is possible to suppress the power consumption in battery 5. As a result, it is possible to suppress such a situation that the charging time becomes longer.

Fourth Embodiment

Figure 7:
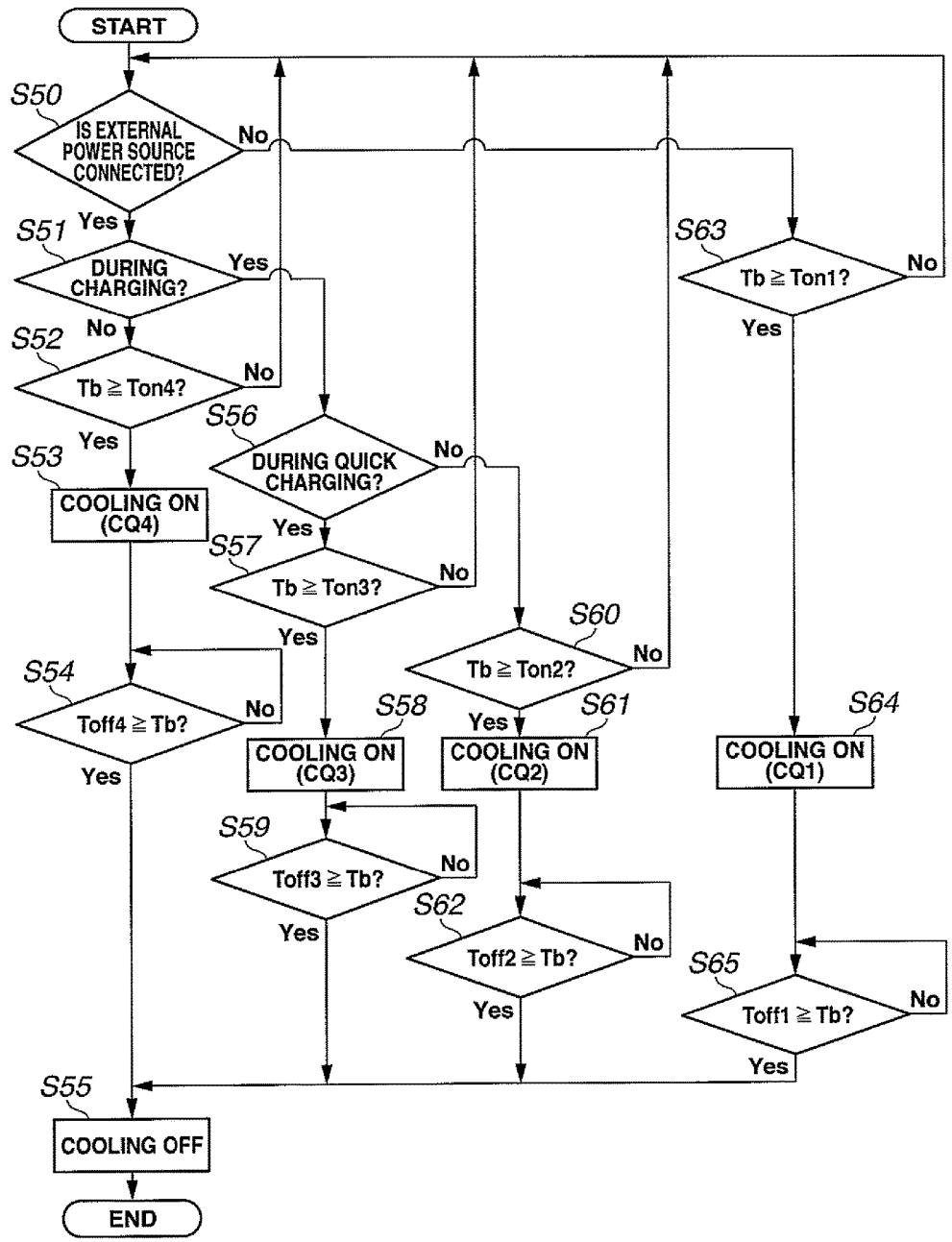
FIG. 7 is a flow chart showing a routine relating to cooling control of a battery according to a fourth embodiment of the present invention.

FIG. 7 is a flow chart showing a routine relating to cooling control of battery 5 according to a fourth embodiment of the present invention. The cooling control of battery 5 according to the fourth embodiment differs from that of the first embodiment in that an operating state of vehicular air conditioner 10 is variably controlled based on the state of a relationship between the external power source and battery 5. Explanations about the points that are in common with the first embodiment are omitted, and the points that are different from the first embodiment will be mainly explained hereinafter.

In the present embodiment, the first to fourth cooling start temperatures Ton1-Ton4 are set to such temperatures as to cause no problem in view of safety and degradation of battery 5 in a load condition required for running, and are set to the same value. On the other hand, the first to fourth cooling stop temperatures Toff1-Toff4 are set to such temperatures as to cause no problem in view of safety and degradation of battery 5 in a non-load condition, and are set to the same value.

As shown in FIG. 7, the processing in each step corresponds to the processing in each step shown in the first embodiment, but differs therefrom in the following points.

Specifically, in step 53 (S53), control unit 40 starts the operation of vehicular air conditioner 10, thereby starting cooling of battery 5 (cooling on). In this case, control unit 40 controls an output of blower 31 on the basis of fourth target output air volume CQ4. Here, the target output air volume is a target value of the output air volume of vehicular air conditioner 10 relating to the cooling of battery 5 (i.e., an air blow volume of blower 31). In the present embodiment, four different target output air volumes, i.e., first to fourth target output air volumes CQ1-CQ4, are preset based on the state of a relationship between the external power source and battery 5. The fourth target output air volume CQ4 provided in the present step is larger than the first target output air volume CQ1, and is also larger than the third target output air volume CQ3 and the second target output air volume CQ2.

Further, in step 58 (S58), control unit 40 starts the operation of vehicular air conditioner 10, thereby starting cooling of battery 5 (cooling on). In this case, control unit 40 controls the output of blower 31 based on the third target output air volume CQ3. The third target output air volume CQ3 provided in the present step is larger than the first target output air volume CQ1, smaller than the fourth target output air volume CQ4, and larger than the second target output air volume CQ2.

Further, in step 61 (S61), control unit 40 starts the operation of vehicular air conditioner 10, thereby starting cooling of battery 5 (cooling on). In this case, control unit 40 controls the output of blower 31 based on the second target output air volume CQ2. The second target output air volume CQ2 provided in the present step is larger than the first target output air volume CQ1, and smaller than the fourth target output air volume CQ4 and the third target output air volume CQ3.

Further, in step 64 (S64), control unit 40 starts the operation of vehicular air conditioner 10, thereby starting cooling of battery 5 (cooling on). In this case, control unit 40 controls the output of blower 31 based on the first target output air volume CQ1. The first target output air volume CQ1 provided in the present step is smaller than the second to fourth target output air volumes CQ2-CQ4.

Thus, in the present embodiment, control unit 40 is configured to change the target output air volumes (CQ1-CQ4) of vehicular air conditioner 10 as the operating state of vehicular air conditioner 10.

With the above configuration, it is possible to reduce the power consumed in battery 5 even while cooling of battery 5 is performed, by changing the target output air volumes (CQ1-CQ4) of vehicular air conditioner 10. As a result, it is possible to suppress performance deterioration and degradation of battery 5, and at the same time, suppress reduction in cruisible distance of electric vehicle 1.

Specifically, in the present embodiment, control unit 40 sets the first target output air volume CQ1 that is set in a case where an external power source to supply electric power to battery 5 is not present, to a value smaller than those of the second to fourth target output air volumes CQ2-CQ4 that are set in a case where an external power source to supply electric power to battery 5 is present. With this configuration, the power consumed by vehicular air conditioner 10 can be decreased, so that the power consumption in battery 5 can be suppressed even while the cooling of battery 5 is performed. As a result, it is possible to suppress performance deterioration and degradation of battery 5, and at the same time, suppress reduction in cruisible distance of electric vehicle 1.

Further, in the present embodiment, in a case where an external power source is present, control unit 40 changes the target output air volumes (CQ2-CQ4) of vehicular air conditioner 10 according to whether or not battery 5 is during charging. Specifically, control unit 40 sets the second or third target output air volume CQ2, CQ3 that is set in a case where battery 5 is during charging, to a value smaller than that of the fourth target output air volume CQ4 that is set in a case where charging of battery 5 is stopped.

With the above configuration, in such circumstances that the charging is performed by the external power source, the power consumption in battery 5 can be suppressed. As a result, it is possible to suppress such a situation that the charging time of battery 5 is prolonged.

Further, in the present embodiment, in a case where battery 5 is during charging, control unit 40 changes the target output air volumes (CQ2, CQ3) of vehicular air conditioner 10 according to whether or not the charging form is quick charging. Specifically, control unit 40 sets the second target output air volume CQ2 that is set in a case where the charging form is non-quick charging (normal charging), to a value smaller than that of the third target output air volume CQ3 that is set in a case where the charging form is quick charging.

Since the charging power on the normal charging is smaller than that on the quick charging, there occurs a problem that when vehicular air conditioner 10 is operated, the electric power that is charged to battery 5 on the normal charging becomes small to thereby increase the time required for charging. In this regard, with the above-described configuration, it is possible to suppress the power consumption in battery 5. As a result, it is possible to suppress such a situation that the charging time becomes longer.

Incidentally, the respective embodiments described above are premised on the cooling control, but the procedure may be applied to heating control. In this case, control unit 40 changes (1) the heating start temperature that is a temperature for determining start of the operation of vehicular air conditioner 10 relating to heating of battery 5, and (2) the heating stop temperature that is a temperature for determining stop of the operation of vehicular air conditioner 10 relating to heating of battery 5, as the operating conditions of vehicular air conditioner 10. In addition, control unit 40 changes (3) the target output temperature that is a target value of the output temperature of vehicular air conditioner 10 relating to heating of battery 5, and (4) the target output air volume that is a target value of the output air volume of vehicular air conditioner 10 relating to heating of battery 5, as the operating states of vehicular air conditioner.

Further, these techniques shown in the respective embodiments may be used not only solely but also in combination of two or more thereof.

Although the electric vehicle to which the battery temperature adjustment apparatus according to the embodiments of the present invention is explained above, the present invention is not limited to the above-described embodiments and may be variously modified within the scope of the invention. Further, in the above-described embodiments, an electric automobile as an electric vehicle is exemplarily explained. However, the present invention is not limited to the electric automobile, and may be applied to various vehicles equipped with a battery, for instance, a hybrid automobile using both an internal combustion engine and a motor, a fuel cell-powered automobile having a fuel cell as a generator, and other vehicle models.

Further, the temperature adjustment section is not limited to the above vehicular air conditioner, and a dedicated device applicable to temperature adjustment for a battery may be utilized as the temperature adjustment section. Further, the external power source may be used in the meaning of a power source except for a battery, and is not required to be present outside the vehicle. Furthermore, the connection with the external power source may be provided in the form of contactless power supply.

The invention claimed is:

1. A battery temperature adjustment apparatus comprising:
    a battery capable of being charged with power supplied from an external power source;
    a temperature adjustment section configured to operate by power supplied from the external power source or the battery and adjust a temperature of the battery by heating or cooling;
    a detection section configured to detect a temperature of the battery; and
    a controller programmed to control an operation of the temperature adjustment section such that a temperature condition of the battery falls in a predetermined temperature region, based on the temperature of the battery detected by the detection section, wherein
    the controller is programmed to:
        judge whether or not the battery is electrically connected to the external power source;
        change an operating condition or an operating state of the temperature adjustment section based on a result of the judgment of whether or not the battery is electrically connected to the external power source, and
        in a case where the battery is not electrically connected to the external power source, restrict the operation of the temperature adjustment section so as to reduce power consumed as compared to a case where the battery is electrically connected to the external power source.

2. The battery temperature adjustment apparatus as claimed in claim 1, wherein the controller is further programmed to:
    in a case where the external power source is electrically connected, change the operating condition or the operating state of the temperature adjustment section according to whether or not the battery is charging.

3. The battery temperature adjustment apparatus as claimed in claim 2, wherein the controller is further programmed to:
    in a case where the battery is charging, change the operating condition or the operating state of the temperature adjustment section according to whether or not a form of the charging is quick charging.

4. The battery temperature adjustment apparatus as claimed in claim 1, wherein
an operation start temperature is the operating condition of the temperature adjustment section, and
the controller is further programmed to change the operation start temperature of the temperature adjustment section.

5. The battery temperature adjustment apparatus as claimed in claim 1, wherein
an operation stop temperature is the operating condition of the temperature adjustment section, and
the controller is further programmed to change the operation stop temperature of the temperature adjustment section.

6. The battery temperature adjustment apparatus as claimed in claim 1, wherein
a target output temperature determines the operating state of the temperature adjustment section, and
the controller is further programmed to change the target output temperature of the temperature adjustment section.

7. The battery temperature adjustment apparatus as claimed in claim 1, wherein
a target output air volume determines the operating state of the temperature adjustment section, and
the controller is further programmed to change the target output air volume of the temperature adjustment section.

8. A battery temperature adjustment apparatus comprising:
a battery capable of being charged with power supplied from an external power source;
a temperature adjustment means for adjusting a temperature of the battery by heating or cooling, the temperature adjustment means operating by power supplied from the external power source or the battery;
a detection means for detecting a temperature of the battery; and
a controller programmed to control an operation of the temperature adjustment means such that a temperature condition of the battery falls in a predetermined temperature region, based on the temperature of the battery detected by the detection means, wherein
the controller is programmed to:
judge whether or not the battery is electrically connected to the external power source;
change an operating condition or an operating state of the temperature adjustment means based on a result of the judgment of whether or not the battery is electrically connected to the external power source, and
in a case where the battery is not electrically connected to the external power source, restrict the operation of the temperature adjustment means so as to reduce power consumed as compared to a case where the battery is electrically connected to the external power source.

9. A battery temperature adjustment apparatus comprising:
a battery capable of being charged with power supplied from an external power source;
a vehicular air conditioner configured to operate by power supplied from the external power source or the battery and adjust a temperature of the battery by heating or cooling;
a battery temperature sensor configured to detect a temperature of the battery; and
a controller programmed to control an operation of the vehicular air conditioner such that a temperature condition of the battery falls in a predetermined temperature region, based on the temperature of the battery detected by the battery temperature sensor, wherein
the controller is programmed to:
judge whether or not the battery is electrically connected to the external power source,
change an operating condition or an operating state of the vehicular air conditioner based on a result of the judgment of whether or not the battery is electrically connected to the external power source, and
in a case where the battery is not electrically connected to the external power source, restrict the operation of the vehicular air conditioner so as to reduce power consumed as compared to a case where the battery is electrically connected to the external power source.

10. The battery temperature adjustment apparatus as claimed in claim 9, wherein the controller is further programmed to:
in a case where the external power source is electrically connected to the battery, change the operating condition or the operating state of the vehicular air conditioner according to whether or not the battery is charging.

11. The battery temperature adjustment apparatus as claimed in claim 10, wherein the controller is further programmed to:
in a case where the battery is charging, change the operating condition or the operating state of the vehicular air conditioner according to whether or not a form of the charging is quick charging.

12. The battery temperature adjustment apparatus as claimed in claim 9, wherein
an operation start temperature is the operating condition of the vehicular air conditioner, and
the controller is further programmed to change the operation start temperature of the vehicular air conditioner.

13. The battery temperature adjustment apparatus as claimed in claim 9, wherein
an operation stop temperature is the operating condition of the vehicular air conditioner, and
the controller is further programmed to change the operation stop temperature of the vehicular air conditioner.

14. The battery temperature adjustment apparatus as claimed in claim 9, wherein
a target output temperature determines the operating state of the vehicular air conditioner, and
the controller is further programmed to change the target output temperature of the vehicular air conditioner.

15. The battery temperature adjustment apparatus as claimed in claim 9, wherein
a target output air volume determines the operating state of the vehicular air conditioner, and
the controller is further programmed to change the target output air volume of the vehicular air conditioner.

16. The battery temperature adjustment apparatus as claimed in claim 1, wherein
an operation start temperature is the operating condition of the temperature adjustment section, the operation start temperature being a temperature at which cooling or heating of the battery begins,
in a case where the battery is electrically connected to the external power source, the operation start temperature of the temperature adjustment section is reached when a temperature of the battery is greater than or equal to a first predetermined temperature, in the case where the battery is not electrically connected to the external power source, the operation start temperature of the temperature adjustment section is reached when the temperature of the battery is greater than or equal to a second predetermined temperature, the second predetermined temperature is greater than the first predetermined temperature.

17. The battery temperature adjustment apparatus as claimed in claim 1, wherein an operation stop temperature is the operating condition of the temperature adjustment section, the operation stop temperature being a temperature at which cooling or heating of the battery ends, in a case where the battery is electrically connected to the external power source, the operation stop temperature of the temperature adjustment section is reached when a temperature of the battery is less than or equal to a first predetermined temperature, in the case where the battery is not electrically connected to the external power source, the operation stop temperature of the temperature adjustment section is reached when the temperature of the battery is less than or equal to a second predetermined temperature, and the second predetermined temperature is greater than the first predetermined temperature.

* * * * *